US012654191B2

(12) United States Patent
Hofman

(10) Patent No.: US 12,654,191 B2
(45) Date of Patent: Jun. 16, 2026

(54) SHOWERHEAD WITH QUICK RELEASE FILTER

(71) Applicant: ETL, LLC, Reno, NV (US)

(72) Inventor: David Hofman, Reno, NV (US)

(73) Assignee: ETL, LLC, Sparks, NV (US)

( * ) Notice: Subject to any disclaimer, the term of this patent is extended or adjusted under 35 U.S.C. 154(b) by 258 days.

(21) Appl. No.: 18/743,716

(22) Filed: Jun. 14, 2024

(65) Prior Publication Data

US 2025/0381576 A1 Dec. 18, 2025

(51) Int. Cl.
*B05B 15/40* (2018.01)
*B05B 1/18* (2006.01)

(52) U.S. Cl.
CPC ................ *B05B 15/40* (2018.02); *B05B 1/18* (2013.01)

(58) Field of Classification Search
CPC ....... E03C 2201/40; B05B 1/14; B05B 15/40; B05B 1/18; C02F 2307/06
USPC ................... 239/553, 575; 210/460; 137/801
See application file for complete search history.

(56) References Cited

U.S. PATENT DOCUMENTS 6,270,023 B1 8/2001 Farley
6,464,869 B1 * 10/2002 Hsu ........................ B01D 35/04 210/418
7,490,372 B2 2/2009 Huang
2007/0006380 A1 * 1/2007 Huang .................... E03C 1/042 4/615
2011/0147286 A1 * 6/2011 Mang ...................... E03C 1/066 210/236
2015/0076254 A1 3/2015 Farley
2022/0234068 A1 * 7/2022 Park ......................... B05B 15/65
2022/0341137 A1 * 10/2022 You .......................... B05B 15/40
2024/0226940 A1 * 7/2024 Deng .................... B05B 12/002

FOREIGN PATENT DOCUMENTS

CN 205462811 U 8/2016
CN 106000679 B 3/2019
CN 215784181 U 2/2022
CN 219923329 U 10/2023
CN 220371317 U 1/2024
EP 2497749 A1 * 9/2012 ........... E03C 1/0409

* cited by examiner

*Primary Examiner* — Arthur O. Hall
*Assistant Examiner* — Kevin Edward Schwartz
(74) *Attorney, Agent, or Firm* — ONE LLP

(57) ABSTRACT

An improved showerhead assembly is provided which includes an easy to remove filter. The showerhead assembly includes a showerhead, elongate shaft, and a filter. The shaft projects tangentially from the showerhead and includes a central channel for storing the filter. The showerhead assembly includes a spring for automatically ejecting the filter when it is replaced. In addition, the showerhead assembly includes a cap and locking mechanism which locks the filter in place during use.

10 Claims, 13 Drawing Sheets

SHOWERHEAD WITH QUICK RELEASE FILTER

BACKGROUND OF THE INVENTION

The present invention relates to showerheads. More particularly, the present invention relates to arm mounts that can be used with handheld showerheads.

Showerheads are commercially available in numerous designs and configurations for use in showers, faucets, spas, sprinklers and other personal and industrial systems. The vast majority of showerheads include spray heads which may be categorized as being either stationary or oscillating and have either fixed or adjustable openings. Stationary spray heads with fixed jets are the simplest constructions consisting essentially of a central channel connected to one or more spray nozzles directed to produce a constant pattern. Multi-function spray heads are able to deliver water in different spray patterns such as a fine spray, a coarse spray, a pulsating spray, or even a flood pattern producing a high fluid flow.

Many showerhead assemblies are fixed directly to a pipe which extends from a shower stall wall. These constructions are inexpensive and require no effort to utilize.

A handheld showerhead assembly typically includes a hollow handle connected to a water supply by a flexible rubber hose. The handle has a proximal end which typically has a threaded inlet for connecting to the rubber hose. Meanwhile, at the handle's distal end, the showerhead assembly includes a showerhead including a plurality of nozzles for ejecting water. Typically, the handle and showerhead face are angled relative to one another so that water is ejected at approximately 90 degrees relative to the handle's longitudinal axis. Advantageously, the showerhead handle allows users to manipulate the spray nozzles into various positions and alignment to assist in the cleaning process.

It is known for both fixed and handheld showerheads to include a filter for removing harmful chemicals and particulates before reaching a bather's body. For example, both U.S. Pat. Nos. 6,016,977 and 6,270,023 disclose handheld showerheads which include filter cartridges for filtering water. Meanwhile, U.S. Pat. No. 7,490,372 describes a showerhead assembly that affixes to a pipe which includes a filter. Unfortunately, these showerhead assemblies employ difficult to operate fasteners which lock the filter media within a showerhead housing. Though bathers are expected to replace the filters periodically, the mechanisms to release the filters are difficult to manually operate.

For example, U.S. Pat. No. 6,270,023 describes an assembly held together with a pair of threaded fasteners. The showerhead assembly is not constructed to accept a wrench or the like and must be manipulated with one's hands. Unfortunately, if tightened excessively, the filter is difficult to dislodge and replace. Meanwhile, both U.S. Pat. No. 7,490,372 and U.S. patent application No. 2015007625 include housings that are opened by twist locks including L-shaped locking blocks. These fastener constructions are easier to manipulate than a threaded fastener. However, adjusting the showerhead nozzles during bathing can cause the showerhead assembly to inadvertently disassemble.

An additional disadvantage with prior showerhead filter assemblies is that even after the assembly's housing has been opened to gain access to a filter, the filter can be difficult to remove from its housing due to being wedged into the housing or from a press-fit between the filter ends and a housing's passageway.

Thus, it would be advantageous to provide a showerhead assembly that has a construction that allows bathers a simple, quick and easy method to replace a filter.

Furthermore, it would be advantageous if the filter would automatically disengage from a water-tight seal with the housing when a bather replaces the filter.

Moreover, it would be desirable to have a showerhead construction did not require tools to replace the filter.

SUMMARY OF THE INVENTION

The present invention addresses the aforementioned disadvantages by providing an improved showerhead assembly which includes a replaceable filter. The filter may contain any filter material for removing chemicals or particulates from water. The showerhead assembly includes a traditional showerhead including plurality of nozzles for expelling water such as for use within a shower stall. The showerhead assembly further includes a hollow shaft which extends tangentially from the backside of the showerhead. In a first embodiment, the exterior of the shaft is constructed to include a traditional handle for a handheld showerhead. In an alternative embodiment, the showerhead is constructed as an extension arm which affixes directly to the male threaded end of a pipe. The shaft includes a proximal end which connects to a water source and distal end which engages the showerhead. The shaft is constructed to include a tubular sidewall having a central channel. The central channel is generally cylindrical in shape, and has a small outlet having a diameter smaller than the diameter of a central channel where water passes from the central channel to the showerhead. This decrease in diameter at the small outlet forms a circular abutment within the central channel.

The shower assembly's filter is positioned within the shaft's central channel. The filter has a body having a diameter slightly smaller than the diameter of the central channel so to allow the filter to slide in and out of the central channel. In addition, the filter has a proximal end port and distal end port. Each of the end ports has a diameter smaller than the diameter of the body. Due to the proximal end port and distal end port having diameters smaller than the filter body, the filter includes a circular proximal wall and a circular distal wall between the filter's body and respective end ports. Preferably, the filter also includes one or more o-rings around the proximal and distal end ports to form fluid tight seals within the shaft's central channel. The filter's distal end port is sized to reside within the central channel's small outlet in a press-fit watertight seal arrangement.

The showerhead assembly further includes a spring located in the central channel with the spring positioned between the filter body's circular distal wall and the central channel's circular abutment. When the filter is installed, the spring is compressed so that the force of the spring causes the filter to be expelled from the shaft's central channel when one desires to replace the filter.

The showerhead assembly further includes a cap located in the proximal end of the shaft's central channel. The cap includes an annular projection, and the annular projection has a central conduit which is sized to receive the filter's proximal end port in a press fit arrangement. In a first embodiment, the cap has an open proximal end having male threads for connecting to a traditional hose of a handheld showerhead. For this embodiment, the hose is connected to a shower stall pipe to supply water through the cap's central conduit to the filter. Water then passes through the filter to the showerhead to be expelled through the nozzles.

In an alternative embodiment, the cap has a closed proximal end. To allow water into the cap's annular projection, the annular projection includes a passageway which extends through the cap's annular projection's sidewall so that water can pass through the annular cap's sidewall into the cap's interior, and thereafter to the filter. For this embodiment, the hollow shaft's sidewall has a hole formed at the shaft's proximal end adjacent to the cap's sidewall passageway. The showerhead assembly further includes a hollow connector at the shaft's hole. The hollow connector connects to a water source, and to this end, preferably includes female threads to connect to the male threads of a traditional pipe. Preferably, the hollow connector is constructed in the form of a ball joint so as to allow the showerhead assembly's showerhead and shaft to pivot about the hollow connector so as to allow one to adjust the position of the showerhead.

The showerhead assembly further includes a locking mechanism for locking the cap within the showerhead assembly's shaft's central channel in a manner that forces the filter towards the shaft's distal end so as to maintain the spring in compression. The locking mechanism may be constructed in various forms, however, in a preferred embodiment, the locking mechanism includes two opposing sidewall openings which project through the distal end of the shaft's tubular sidewall. Moreover, this preferred locking mechanism includes a locking collar positioned within an annular recess formed around the cap. The locking collar includes a pair of tabs which project through the tubular sidewall openings to lock the locking collar and cap in place. The filter can be released by simply manually depressing the tabs inwardly. Upon depressing the tabs, the spring forces the filter and cap to be expelled from the shaft's central channel.

Advantageously, a showerhead assembly is provided which allows a bather to simply, quickly, and easily replace.

Furthermore, the showerhead assembly includes a filter which is automatically ejected during the replacement process.

Also advantageously, the showerhead's filter can be replaced without requiring any tools.

Other features and advantages of the present invention will be appreciated by those skilled in the art upon reading the detailed description which follows with reference to the drawings.

DETAILED DESCRIPTION OF THE INVENTION

Figure 1:
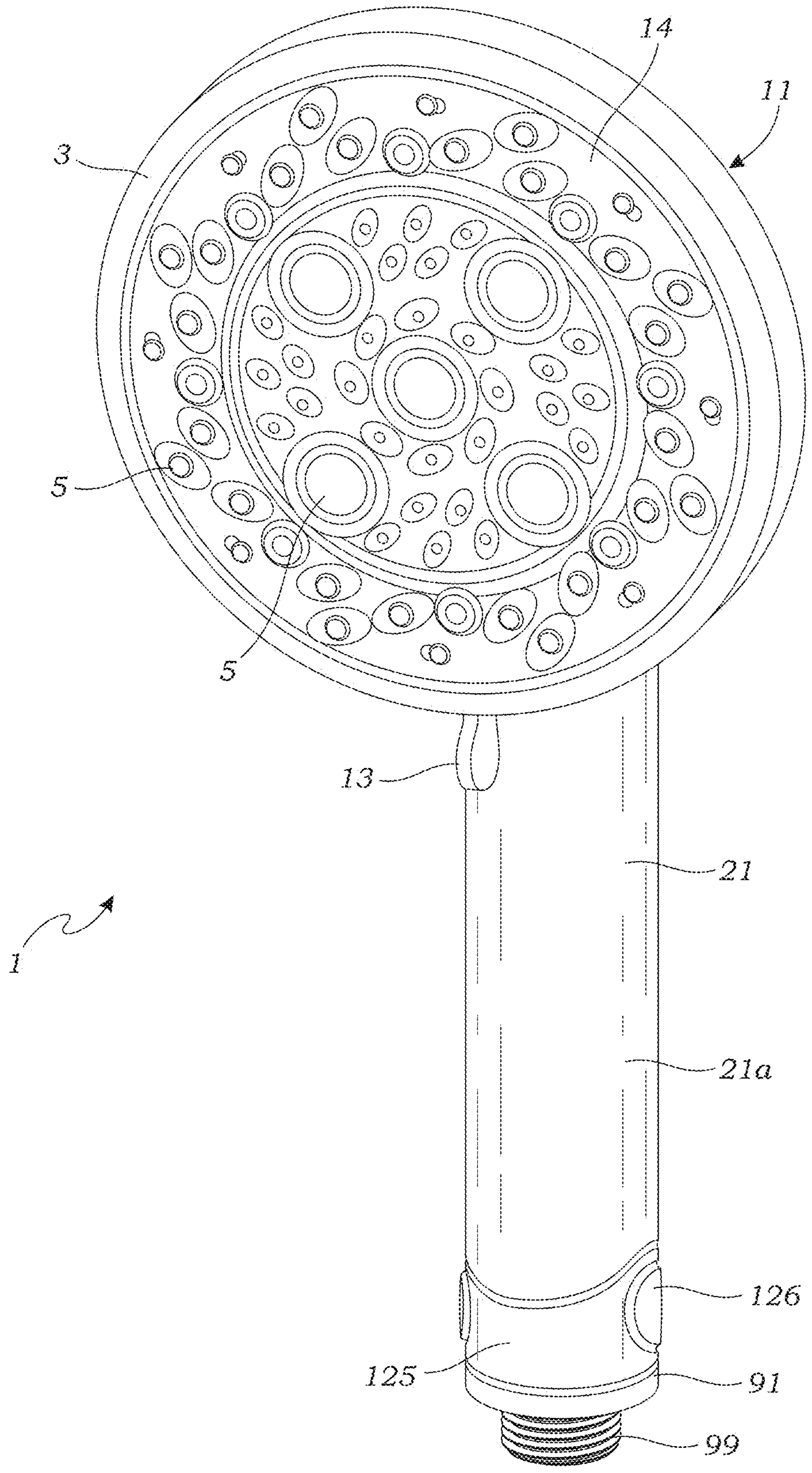
FIG. 1 is a perspective view of a first embodiment of a showerhead assembly with quick release filter in the form of a handheld showerhead.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to all FIGS. 1-24, the showerhead assembly 1 includes three primary components including: a showerhead 3, a shaft 21, and a filter 45. The showerhead 3 has a traditional construction including a front face 5 and a backside 11. The face includes a plurality of nozzles 7 which spray water. Though not shown in the figures, the showerhead includes a central cavity which receives water from the shaft and supplies water to the nozzles 7.

Figure 2:
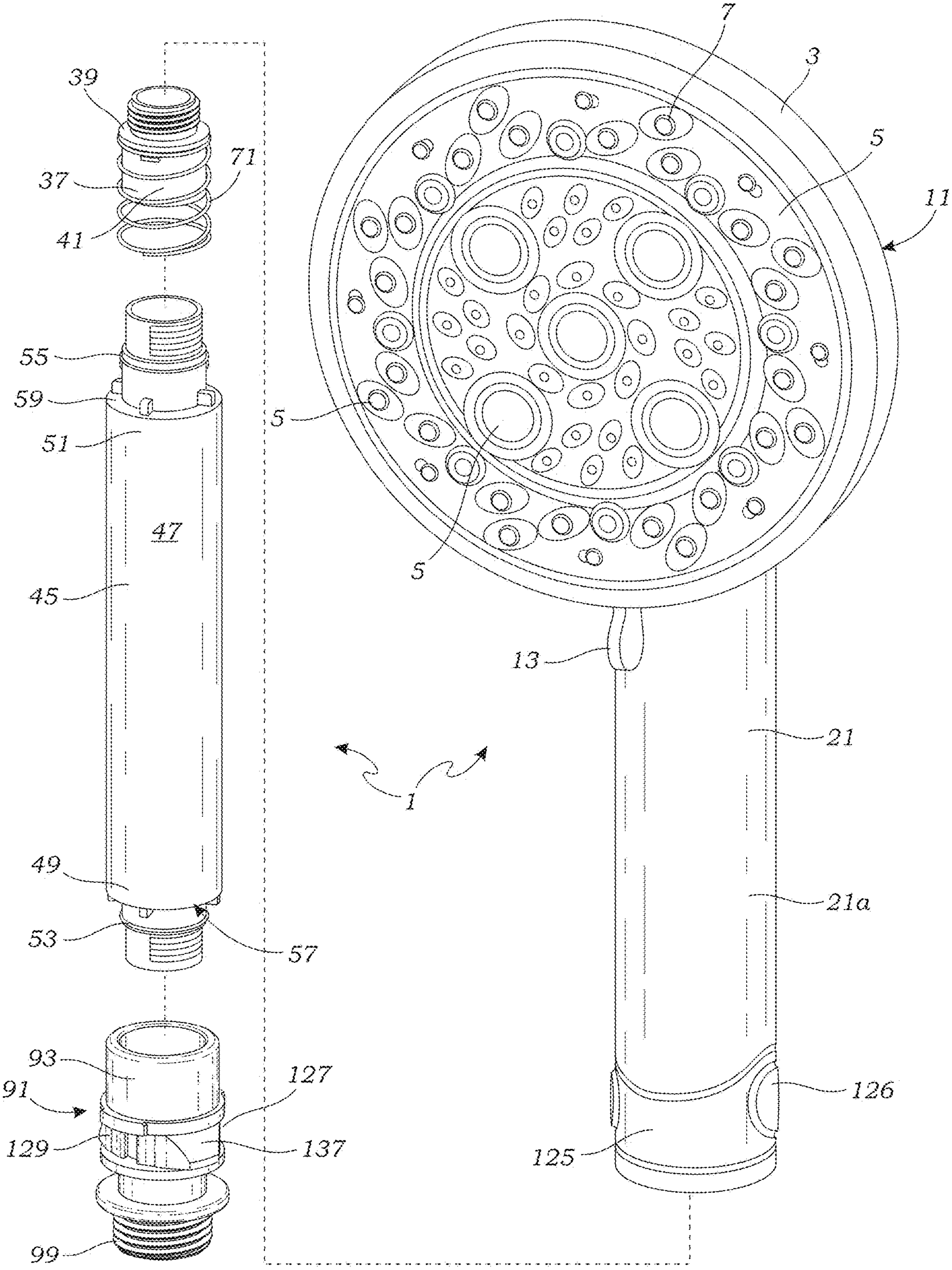
FIG. 2 is an exploded perspective view of the showerhead assembly shown in FIG. 1.
Figure 3:
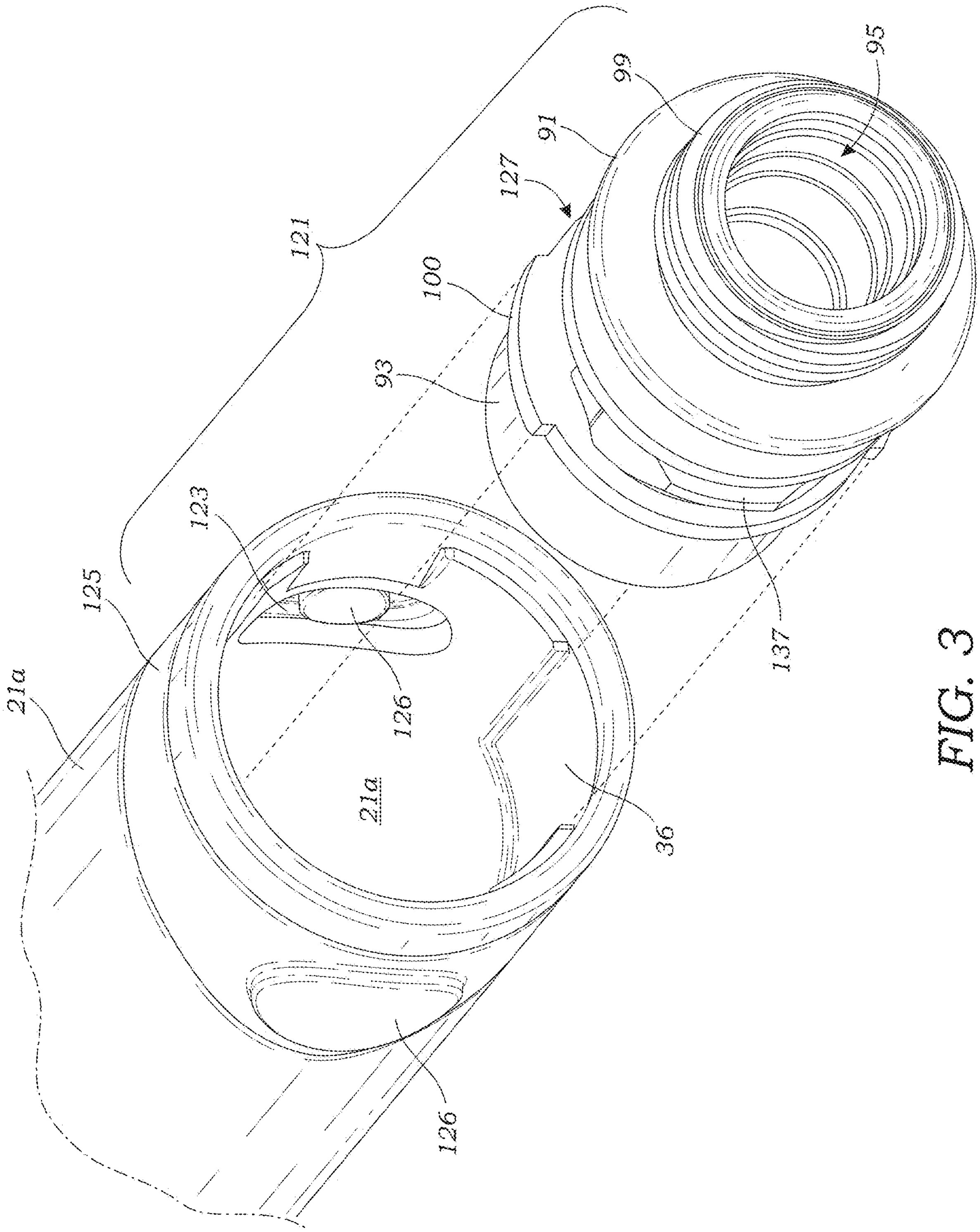
FIG. 3 is a perspective view of the shaft and cap found in the showerhead assembly shown in FIG. 1.
Figure 12:
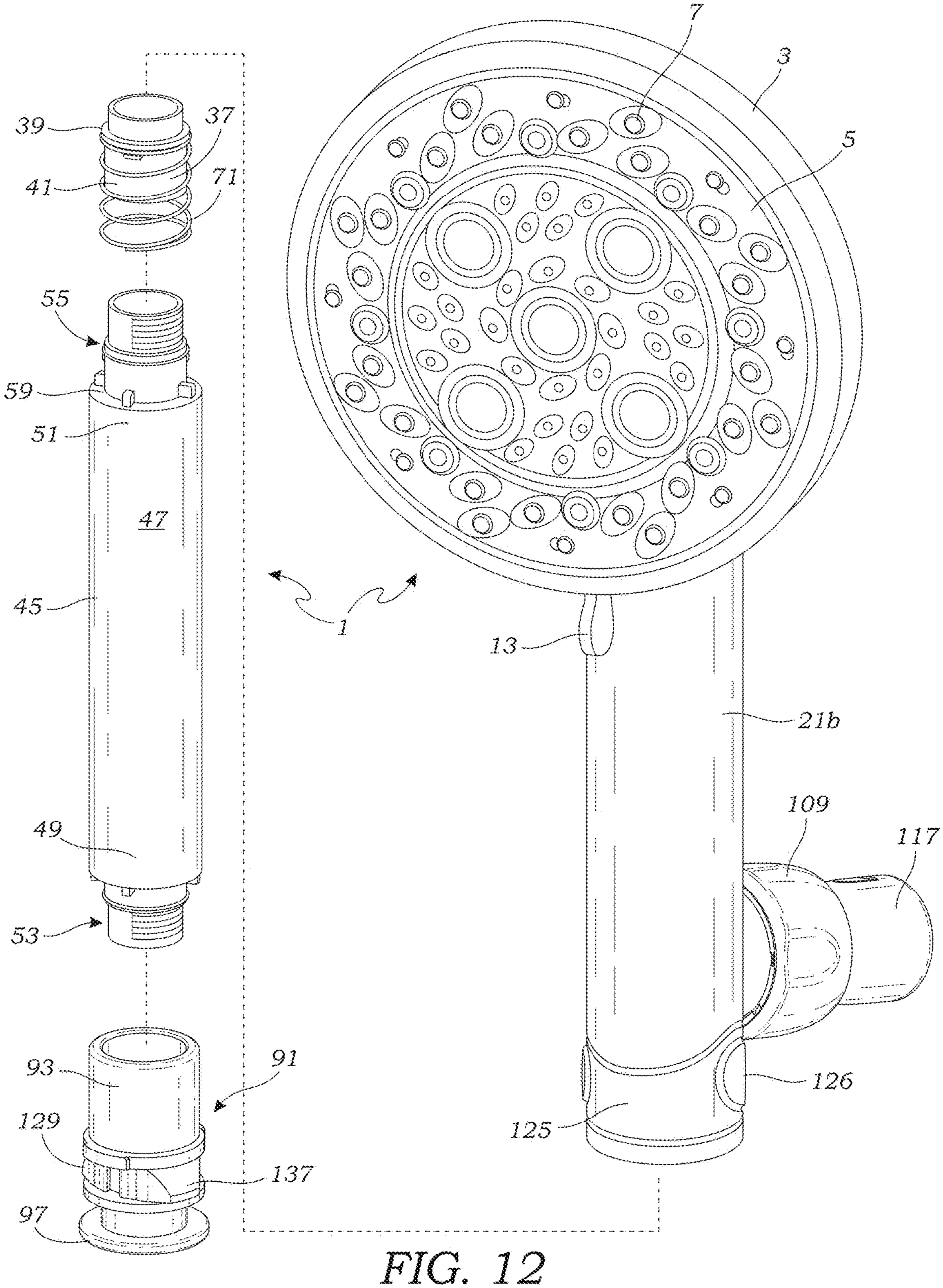
FIG. 12 is an exploded perspective view of the showerhead assembly shown in FIG. 11.
Figure 13:
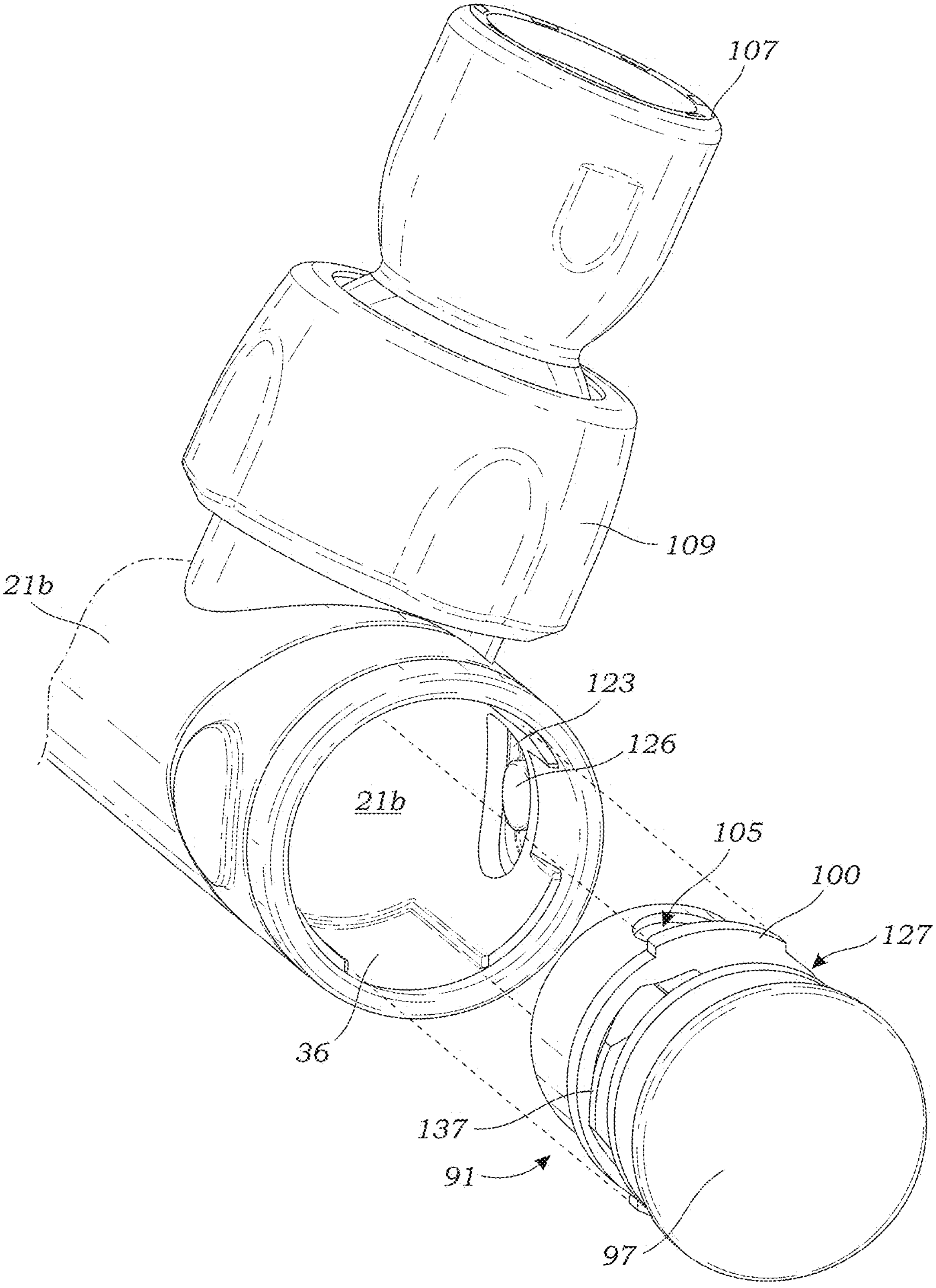
FIG. 13 is a perspective view of the shaft and cap found in the showerhead assembly shown in FIG. 11.
Figure 14:
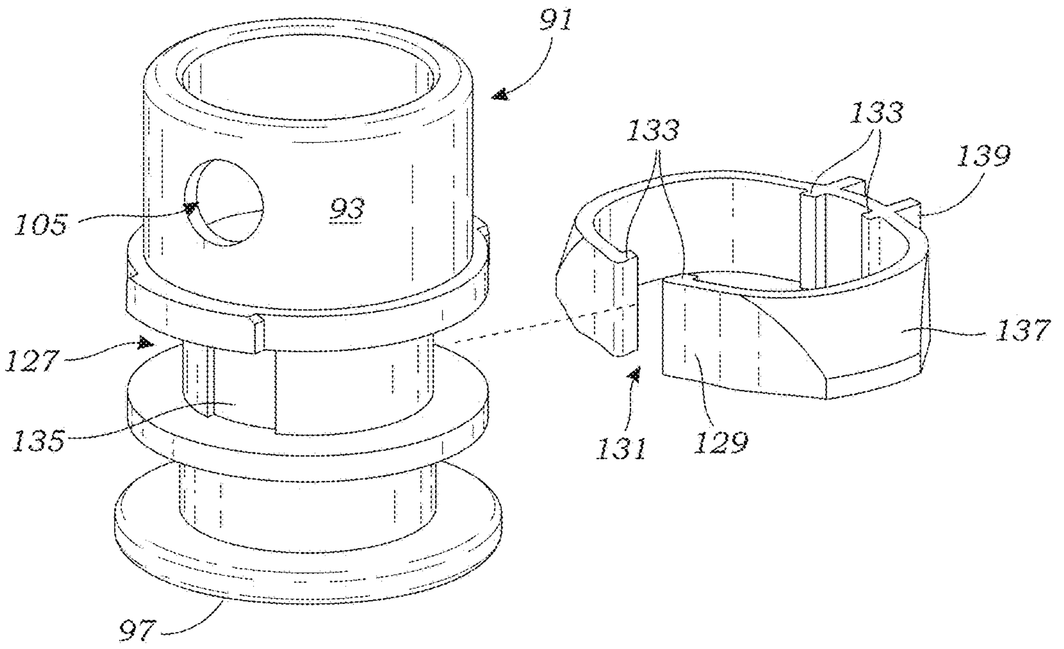
FIG. 14 is a perspective view of the shaft and cap found in the showerhead assembly shown in FIG. 11.
Figure 15A:
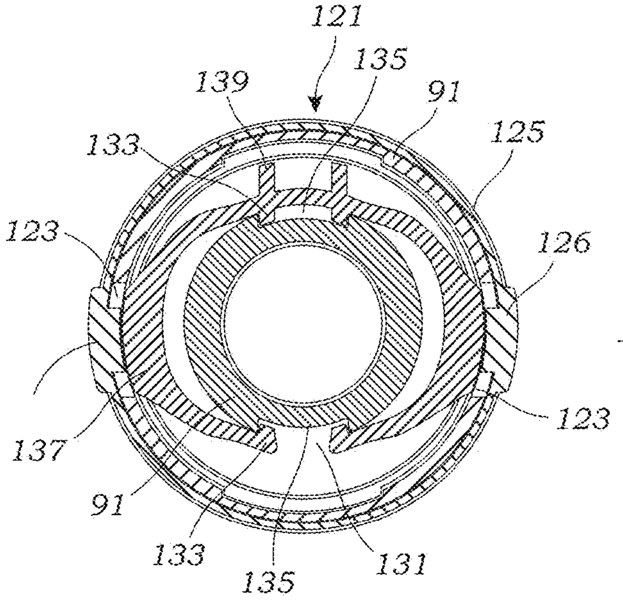
FIG. 15A is a bottom plan view of the shaft, cap, and locking mechanism of the showerhead assembly of FIG. 11.
Figure 15B:
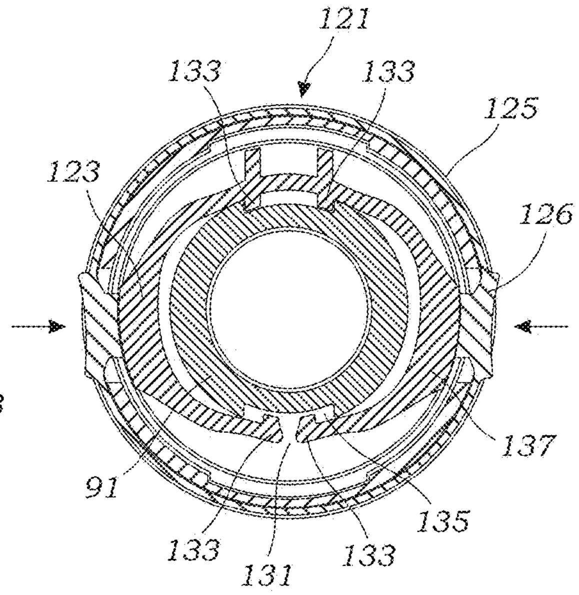
FIG. 15B is the shaft, cap, and locking mechanism shown in FIG. 15A wherein the locking mechanism has been unlocked.

Still with reference to all of the Figures, the showerhead assembly's shaft 21 includes a proximal end 23 which connects to a water source and a distal end 25 which engages the showerhead 3. The shaft 21 is hollow and includes a tubular sidewall 27 which forms a central channel 29. The central channel 29 is substantially cylindrical but narrows at its distal end to form a circular abutment 31 and small outlet 33 which supplies water to the showerhead's cavity (not shown). With reference particularly to FIGS. 2 and 12, the shaft may include a detachable coupler 37 which is located within the distal end of the shaft's central channel 29. The coupler includes a radially projecting edge 39 and a tubular sidewall 41. The tubular sidewall 41 has an outside diameter smaller than interior diameter of the shaft's central conduit 29 so as to form an annular space 43 between the coupler's tubular wall and the shaft's tubular sidewall 27.

As illustrated in the Figures, the showerhead assembly's filter 45 includes a cylindrical body 47. The filter's body 47 has a diameter slightly smaller than the diameter of the central channel 29 so as to allow the filter to slide and reside within the shaft's central channel 29. The filter's body includes a proximal end 49 and a distal end 51. The filter further includes a proximal end port 53 which extends proximally from the filter's body's proximal end 49, and a distal end port 45 which extends distally from the filter body's distal end 51. The proximal end port 53 and distal end port 55 have diameters smaller than the filter body's diameter so that the filter body includes a circular proximal wall 57 and a circular distal wall 59. Preferably, the filter includes one or more o-rings 61 which surround the proximal end port 53 and distal end port 55. The filter 45 is positioned within the shaft's central channel 29 so that the filter's distal end port 55 projects into the shaft's central channel's small outlet 33. Preferably, the one or more o-rings 61 provide a watertight seal between the filter 45 and the shaft's small outlet 33.

With reference to FIGS. 2, 8, 9, 12, 18, and 19, the showerhead assembly also includes a spring 71. The spring 71 is positioned within the shaft's central channel 29 around the distal end port 55 so that the spring's proximal end 77 engages the filter body's circular distal wall 59, and the spring's distal end 79 engages the shaft's tubular abutment 31. When the filter 45 is positioned properly within the shaft's central channel 29, the spring 71 is in a state of compression.

With reference to all of the Figures, the showerhead assembly 1 also includes a cap 91 which maintains the filter within the shaft's central channel 29. The cap 91 includes an annular projection 93 includes a conduit 94 for the passage of water, and has an outer diameter sized to slide telescopically within the shaft's central conduit's proximal end.

Figure 10:
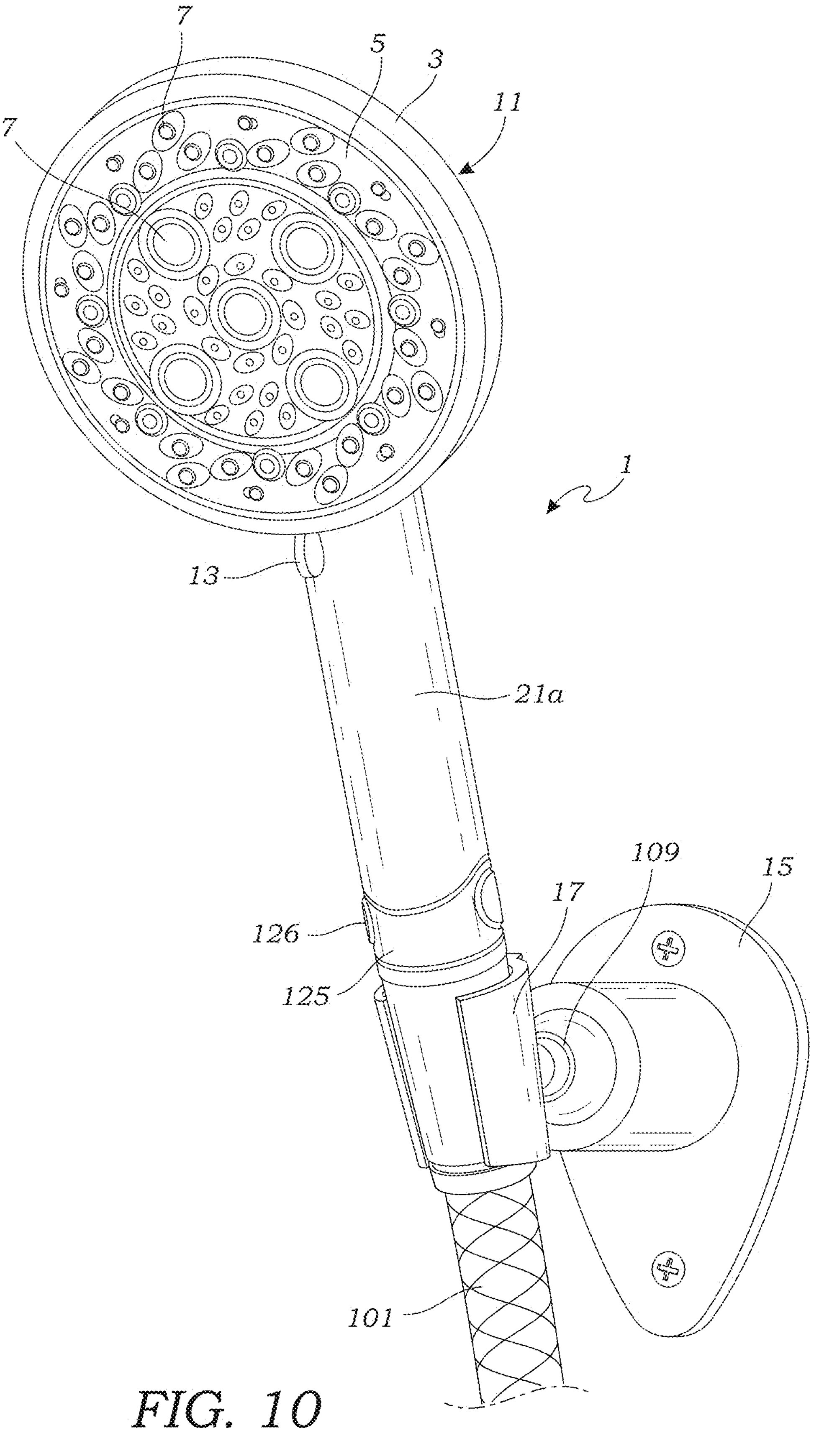
FIG. 10 is a perspective view of a first embodiment of a showerhead assembly with quick release filter shown affixed to a wall.
Figure 11:
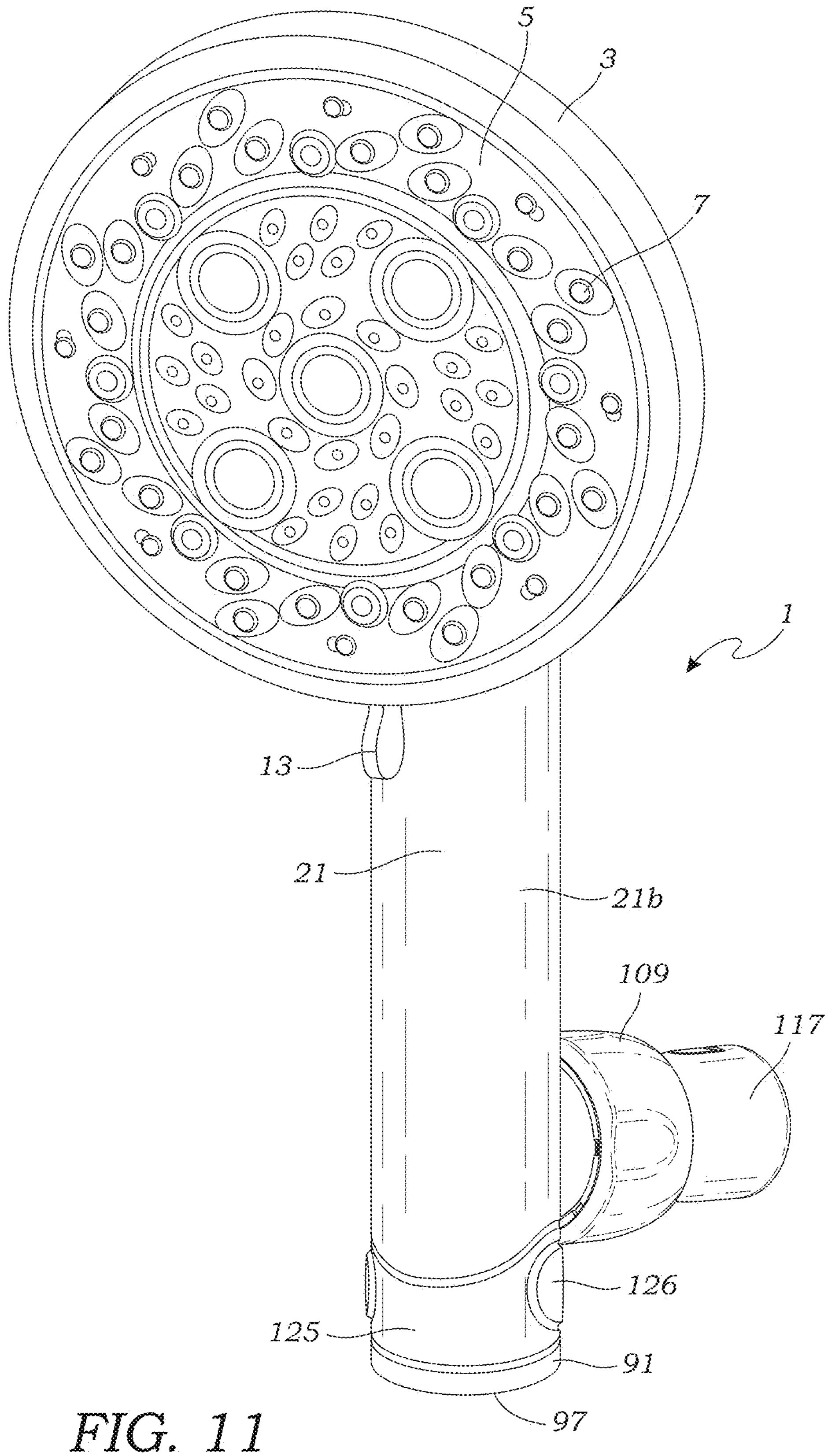
FIG. 11 is a perspective view of a first embodiment of a showerhead assembly with quick release filter including an extension arm that affixes to the end of a pipe.

With reference to FIGS. 1-10, in a first embodiment, the shaft 21 is constructed as a handle 21*a* for providing a handheld showerhead. For this embodiment, the cap 91 includes an open end 95 and male threads 99 sized to connect to the female threads of a typical flexible hose 101. With reference to FIG. 10, this showerhead assembly embodiment is intended for use with a wall mount 15 having a showerhead receptacle 17 having a slot sized to allow the hose 101 to pass for holding the handheld showerhead 1 in a proper alignment for bathing.

Figure 19:
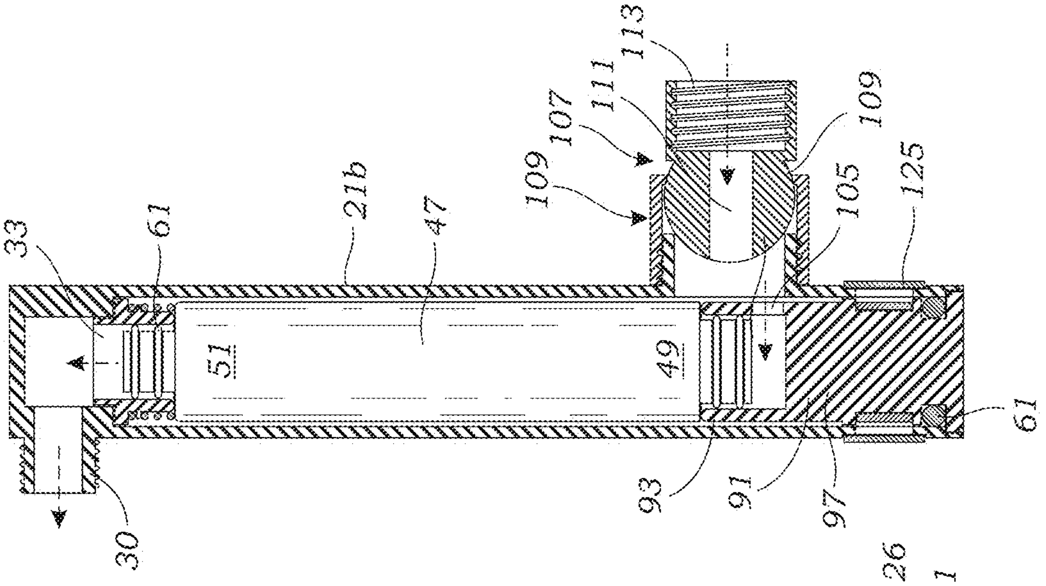
FIG. 19 is a front side cut-away view of the showerhead assembly shown in FIG. 11.
Figure 18:
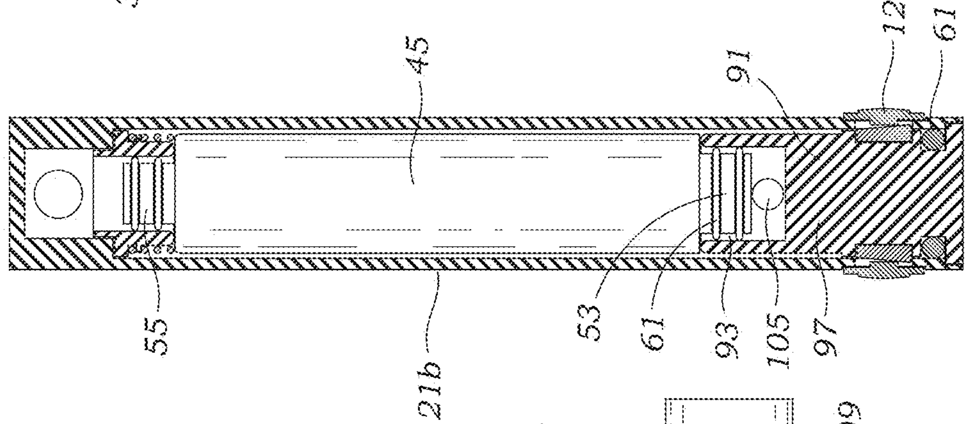
FIG. 18 is a front side cut-away view of the showerhead assembly shown in FIG. 11.
Figure 17:
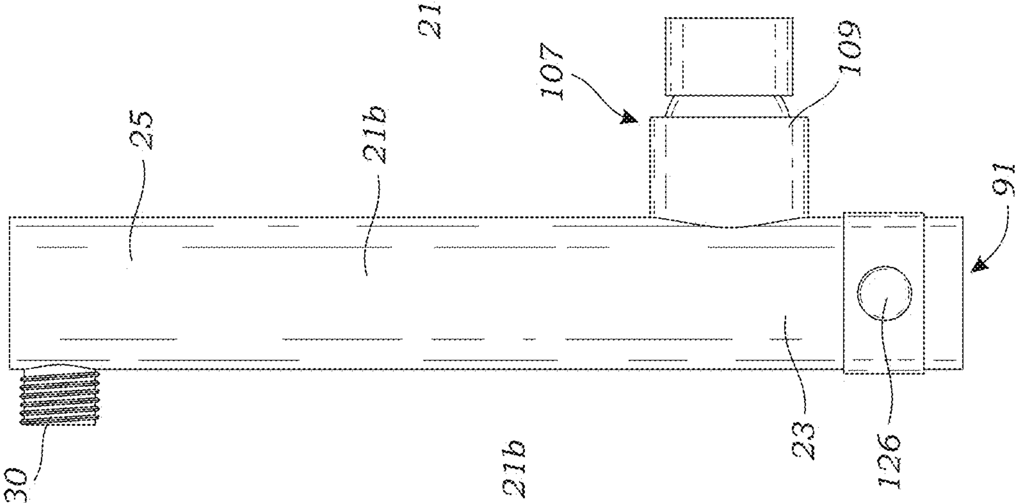
FIG. 17 is a left side view of the showerhead assembly shown in FIG. 11.
Figure 16:
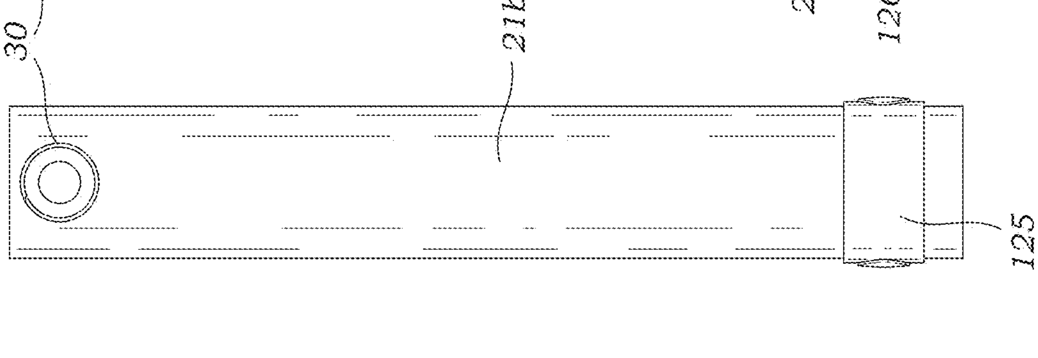
FIG. 16 is a front view of the showerhead assembly shown in FIG. 11.
Figure 21:
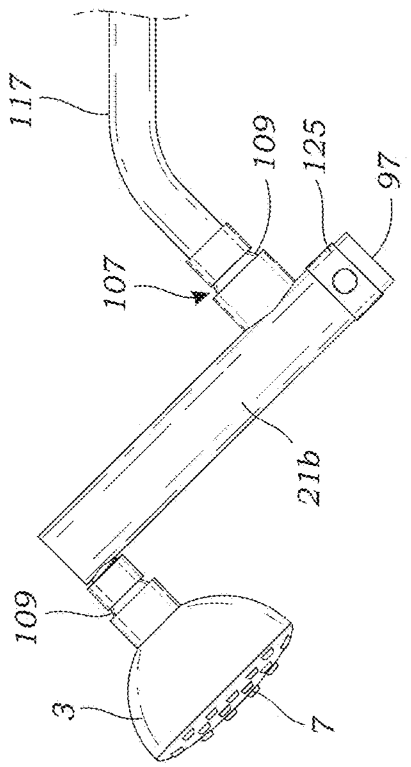
FIG. 21 is a right side view of the showerhead assembly shown in FIG. 20 wherein the showerhead assembly has been rotated about a ball joint at the pipe.
Figure 23:
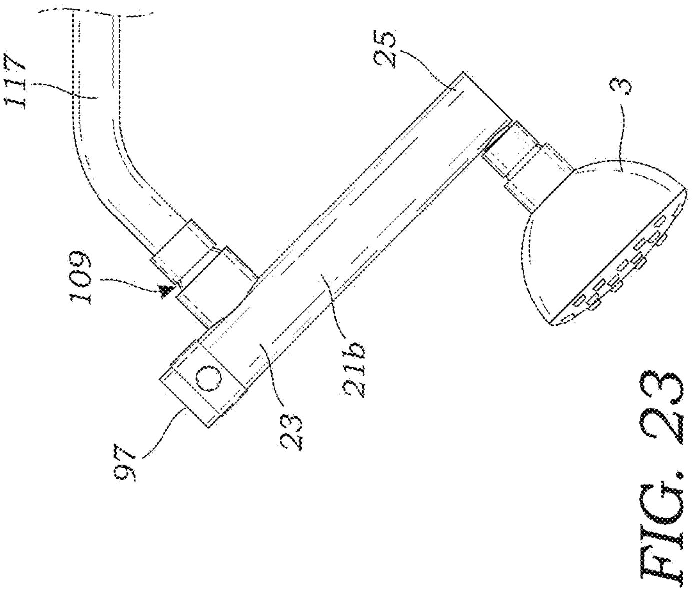
FIG. 23 is a right side view of the showerhead assembly shown in FIG. 20 wherein the showerhead assembly's showerhead and shaft have been rotated at the pipe.
Figure 20:
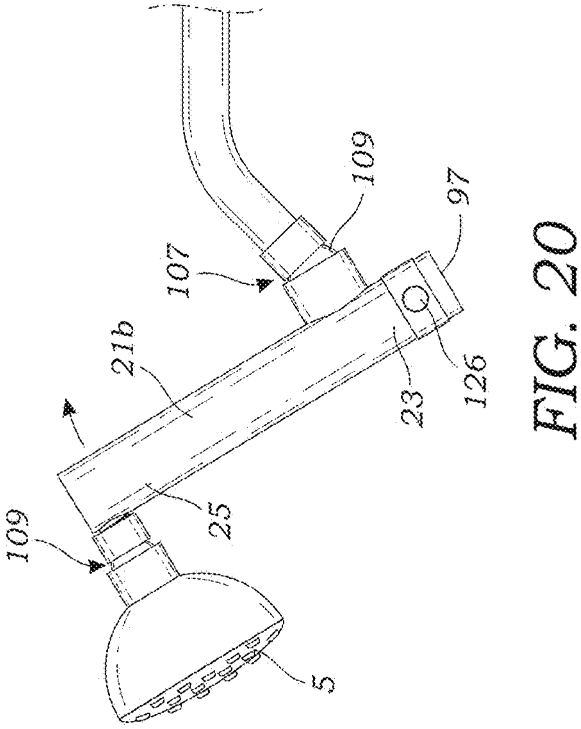
FIG. 20 is a right side view of the showerhead assembly shown in FIG. 11 wherein the showerhead assembly is affixed to a pipe.
Figure 22:
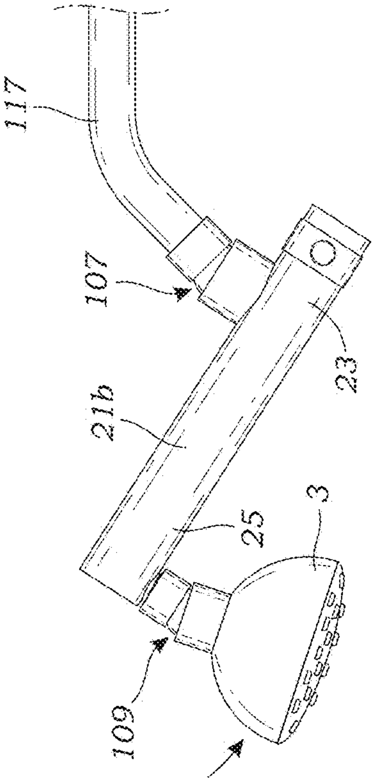
FIG. 22 is a right side view of the showerhead assembly shown in FIG. 20 wherein the nozzle has been adjusted relative to the shaft and the shaft has been adjusted at the ball joint at the pipe.
Figure 24:
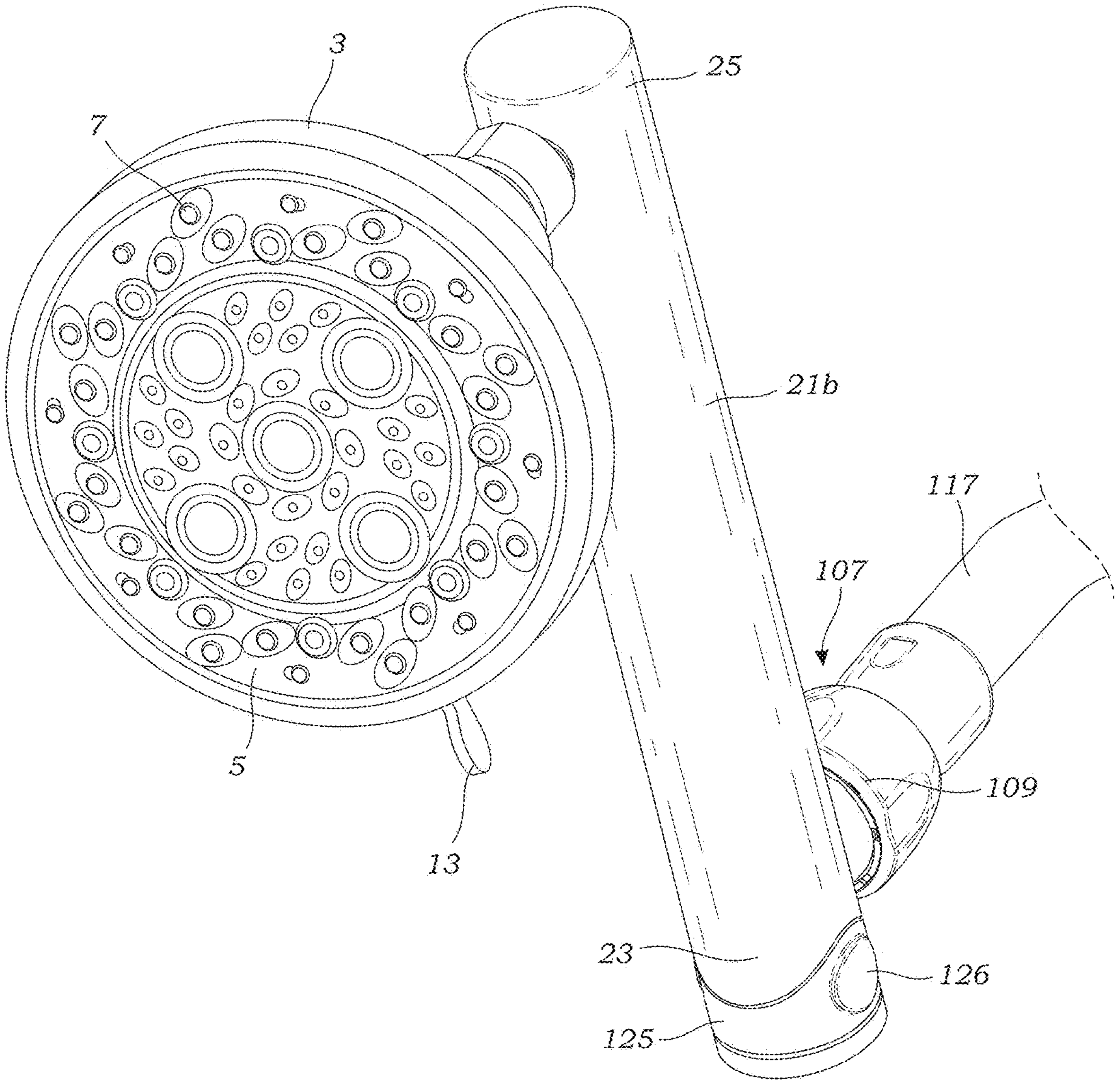
FIG. 24 is a perspective view of the showerhead assembly shown in FIGS. 11-23.

In an alternative embodiment illustrated in FIGS. 11-24, the showerhead assembly's cap 91 has a closed end 97. With reference particularly to FIG. 19, instead of water entering into the cap through a threaded inlet as illustrated in FIGS. 1-10, the cap 91 includes a passageway 105 which extends radially through the cap's annular projection 93. To allow water to enter the passageway 105, the shaft's tubular sidewall 27 has an adjacent hole 35. As illustrated in FIGS. 11-24, this showerhead assembly embodiment includes a hollow connector 107. Preferably, the hollow connector 107 includes a ball joint 109 and female threads 113 for connecting to the male threads of a pipe 117. The hollow connector includes a tunnel 111 for allowing water from the pipe 117 to enter through the sidewall hole 35, to in turn, pass through the cap's passageway 105 to the interior of the cap's annular projection 93. Thereafter, water passes through the filter 45 to the showerhead 3.

Preferably, the showerhead assembly includes a locking mechanism 121 that prevents the cap 91 from being ejected from the shaft's central channel and maintains the filter 45 positioned within the shaft's central channel so that the filter's distal end port 55 provides a fluid tight seal with the central channel's small outlet 33. More specifically, the locking mechanism 121 prevents the showerhead assembly's spring 71 from inadvertently ejecting the filter. In a preferred embodiment, the locking mechanism 121 includes a pair of opposing openings 123 formed in the shaft's tubular sidewall 27 at the shaft's proximal end 23. The locking mechanism further includes a "C" shaped locking collar 129 which resides within a circular recess formed around the cap 91. The locking collar 129 includes a pair of opposing tabs 137 which project through the shaft's sidewall openings 123 when the filter is locked in position. When projected through the tubular sidewall's opening 123, the tabs prevent the cap from disengaging from the shaft 21 which would allow the filter to otherwise be ejected. However, depression of the locking collar's 37 tabs inwardly allows the locking collar 129 and cap 91 to disengage from the shaft 21, thereby allowing the spring 71 to eject the filter 45 from the shaft's central channel. With reference to FIGS. 4, 5A, 5B, 14, 15A, and 15B, a preferred locking collar 129 has a space 131 which allows the "C" shaped structure to bias outwardly or be compressed inwardly. Furthermore, preferably, the locking collar includes 4 detents 133 which are intended to reside within two opposed indents 135 formed on the exterior of the cap 91. Preferably, the locking collar 129 also includes spacer tabs 139 for positioning and restricting rotation of the locking collar 129 relative to the shaft 21 and cap 91.

Figure 4:
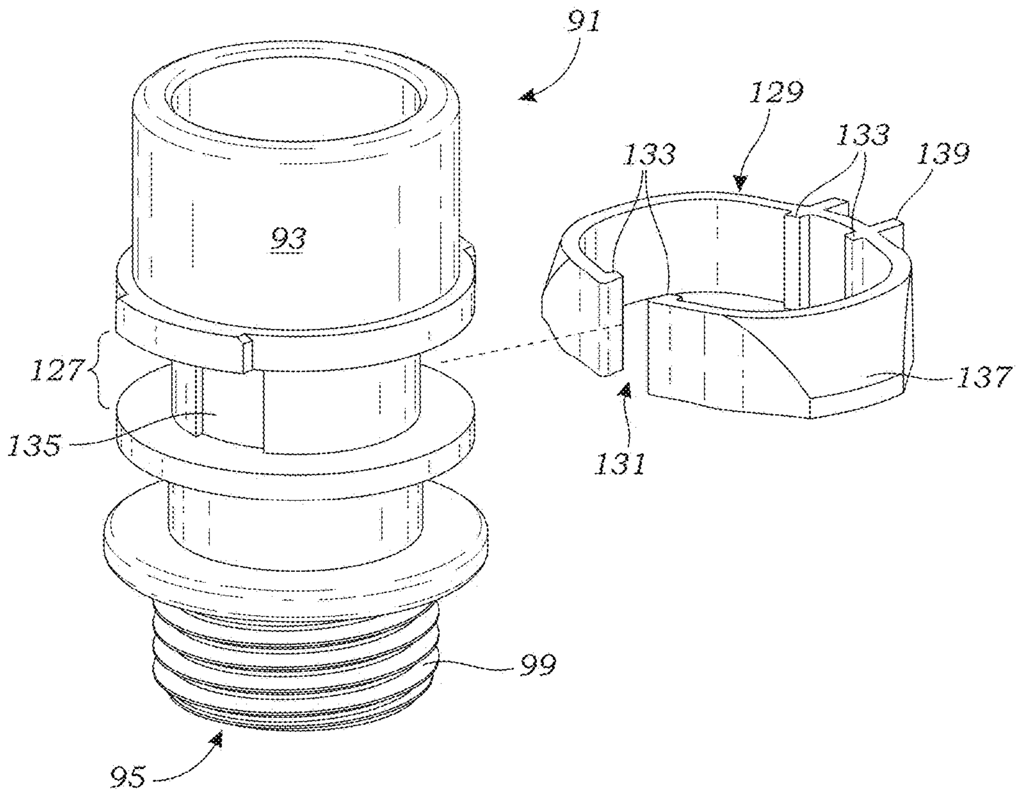
FIG. 4 is an exploded perspective view of the cap and locking collar of the showerhead assembly shown in FIG. 1.
Figure 5A:
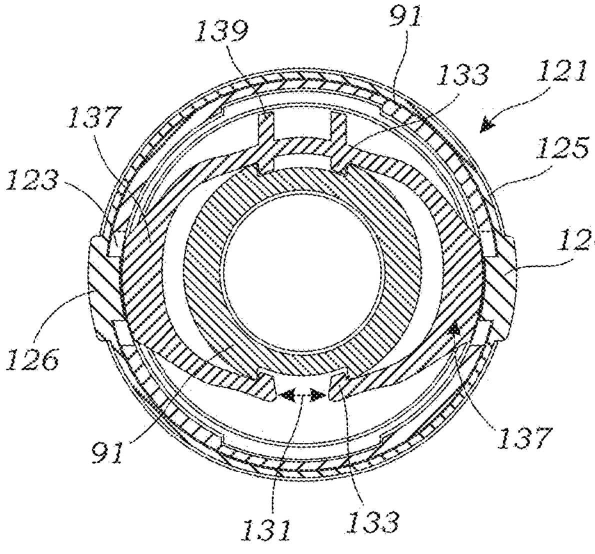
FIG. 5A is a bottom plan view of the shaft, cap, and locking mechanism of the showerhead assembly of FIG. 1.
Figure 5B:
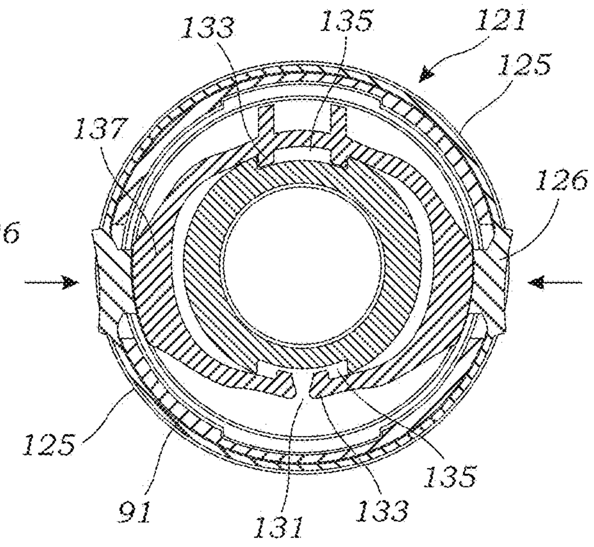
FIG. 5B is the shaft, cap, and locking mechanism shown in FIG. 5A wherein the locking mechanism has been unlocked.
Figure 9:
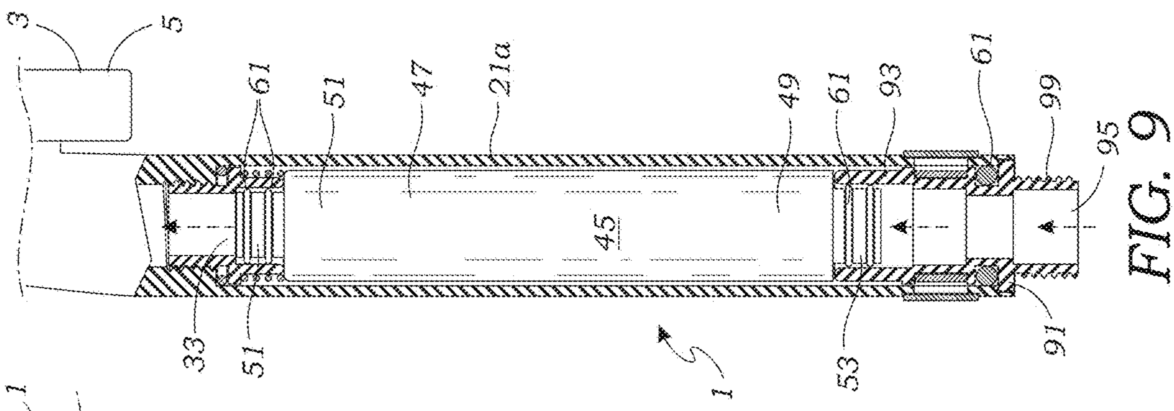
FIG. 9 is a front side cut-away view of the showerhead assembly shown shown in FIG. 1.
Figure 8:
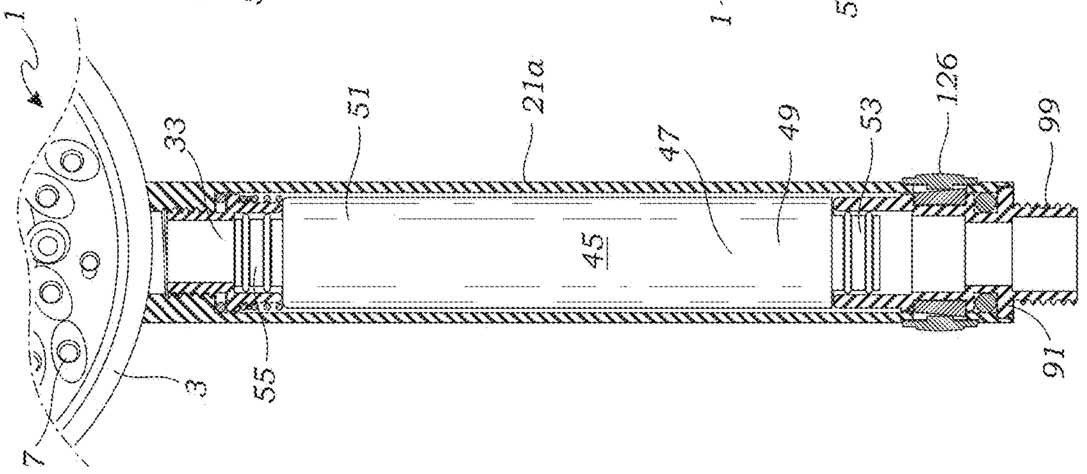
FIG. 8 is a front side cut-away view of the showerhead assembly shown shown in FIG. 1.
Figure 7:
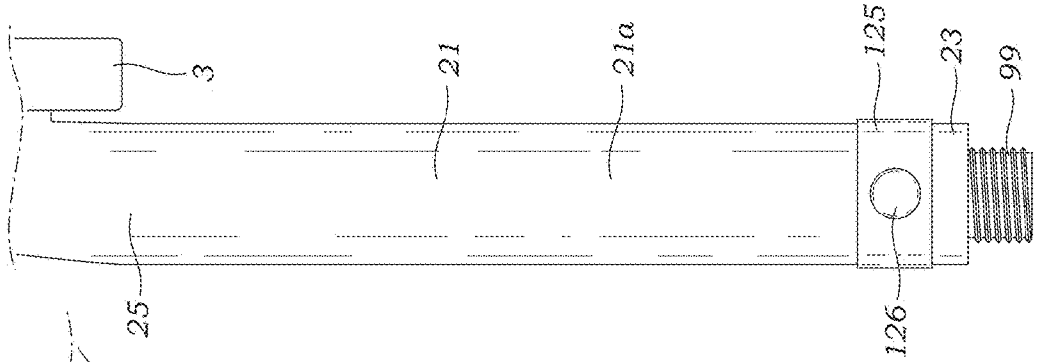
FIG. 7 is a left side view of the showerhead assembly shown in FIG. 1.
Figure 6:
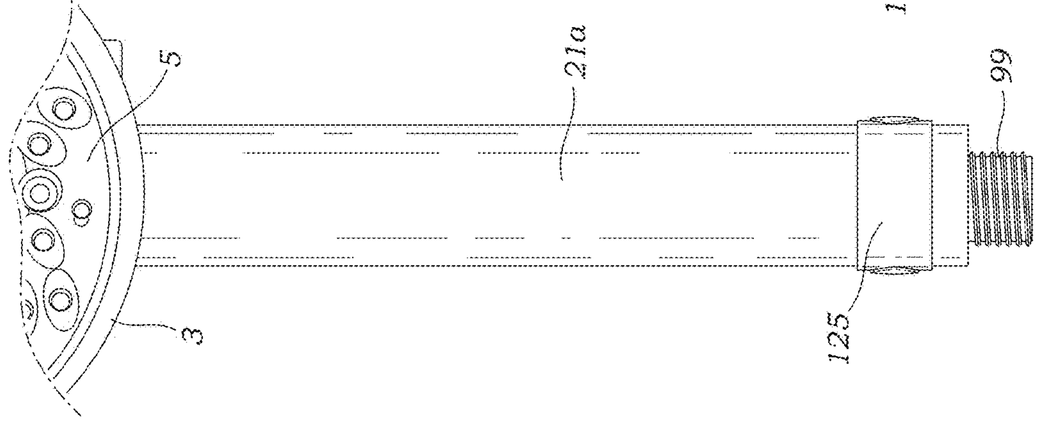
FIG. 6 is a front view of the showerhead assembly shown in FIG. 1.

Preferably, the locking mechanism 121 also includes an elastomeric ring 125 which covers the shaft's tubular sidewall openings 123 and locking collar tabs 137. Preferably, the elastomeric ring also includes buttons 126 which are shaped to facilitate the depression the locking collar tabs 137. Advantageously, the showerhead assembly 1 allows a bather the ability to simply depress the elastomeric ring's buttons 126 to remove and replace an interior filter 45. Depression of the buttons 126 causes the locking collar's tabs 137 to recede inwardly. As illustrated in FIGS. 4 sand 14, preferably the locking collar's tabs are tapered so as to facilitate insertion of the cap into the shaft's central channel to reinstall a filter 45 so as to not get stuck within the shaft's central channel.

Preferred showerhead assemblies have been illustrated and described herein, it will be apparent that various modifications can be made without departing from the spirit and scope of the invention. Accordingly, it will be apparent that various modifications can be made without departing from the spirit and scope of the invention.

Therefore, having described my invention in such terms such as to enable a person skilled in the art to understand the invention, recreate the invention and practice it, and having presently identified the presently preferred embodiments thereof, I claim:

1. A showerhead assembly comprising:

a showerhead having a front face and a plurality of nozzles projecting from said front face;

an elongate shaft having a distal end affixed to said showerhead and a proximal end, said shaft including a tubular sidewall forming a central channel which extends from said shaft's proximal end to its distal end for transporting water received from said shaft's proximal end to said showerhead, said central channel's diameter decreasing at said central channel's distal end to form a circular abutment;

a filter located in said central channel, said filter having a body that is substantially cylindrical and includes a proximal end and distal end, said filter further including a proximal end port and a distal end port, said distal end port having a diameter smaller than said body's diameter to form a circular distal wall where said distal end port extends from said body's distal end, said proximal end port having a diameter smaller than said body's diameter to form a circular proximal wall where said proximal end port extends from said body's proximal end;

a spring positioned between and engaging said abutment and said body, said spring having an outer diameter smaller than said central channel so as to reside within said central channel, said spring having an inner diameter larger than said distal end port so as to receive said distal end port so as to allow said spring to engage said body;

an engageable and disengageable cap located as said shaft's proximal end, said cap having an annular projection that projects into said shaft's central channel, said annular projection having an inner diameter to receive said proximal end port; and a locking mechanism to lock said cap to said shaft's proximal end in a position that forces said filter toward said abutment and maintains said spring in a state of compression, said locking mechanism releasable to release said cap from said shaft proximal end to allow said spring to eject said filter.

2. The showerhead assembly of claim 1 wherein:

said shaft is shaped as a handle for manually manipulating a position of said showerhead; and said cap includes an open proximal end in fluid connection to an interior of said cap's annular projection, said cap's proximal end including male threads;

said showerhead assembly further includes a hose having first and second ends with said first end having female threads connected to said cap's male threads and said second end having female threads to affix to male threads of a pipe.

3. The showerhead assembly of claim 2 wherein the locking mechanism includes two opposed openings which extend through said shaft's tubular sidewall, an elastomeric ring covering said opposed openings, a circular recess formed in said cap adjacent to said opposed openings, and a locking collar positioned in said circular recess, said locking collar including a pair of opposed tabs which extend through said opposed openings, said locking collar being spring loaded to force said tabs into said opposed openings to restrict telescopic movement of said cap relative to said shaft unless said elastomeric ring is manually depressed at said openings to engage and force said tabs inward to release said cap from said shaft's proximal end to allow said spring to eject said filter.

4. The showerhead assembly of claim 2 further comprising:

a coupler located within said central channel's distal end, said coupler including a radially projecting edge that forms said abutment, and said coupler including a tubular wall spaced from said shaft's tubular sidewall to form an annular space, with said spring within said annular space.

5. The showerhead assembly of claim 2 further comprising:

at least one o-ring around said distal end port to form a water tight seal with said tubular sidewall; and at least one o-ring around said proximal end port to form a water tight seal with said cap's annular projection.

6. The showerhead assembly of claim 1 wherein:

said shaft has a hole which extends radially through said shaft's tubular sidewall; and said cap has a closed proximal end, said cap including a passageway that extends radially through said annular projection, said passageway adjacent to said hole to allow water to flow through said hole to the interior of said annular projection to said filter;

a hollow connector for connecting said hole to a water source.

7. The showerhead assembly of claim 6 wherein said connector is a ball joint including a female threaded end capable of affixing to a male threaded pipe.

8. The showerhead assembly of claim 6 wherein the locking mechanism includes two opposed openings which extend through said shaft's tubular sidewall, an elastomeric ring covering said opposed openings, a circular recess formed in said cap adjacent to said opposed openings, and a locking collar positioned in said circular recess, said locking collar including a pair of opposed tabs which extend through said opposed openings, said locking collar being spring loaded to force said tabs into said opposed openings to restrict telescopic movement of said cap relative to said shaft unless said elastomeric ring is manually depressed at said openings to engage and force said tabs inward to release said cap from said shaft's proximal end to thereby cause said spring to eject said filter.

9. The showerhead assembly of claim 6 further comprising:

a coupler located within said central channel's distal end, said coupler including a radially projecting edge that forms said abutment, and said coupler including a tubular wall spaced from said shaft's tubular sidewall to form an annular space, with said spring within said annular space.

10. The showerhead assembly of claim 1 further comprising:

at least one o-ring around said distal end port to form a watertight seal with said tubular sidewall; and at least one o-ring around said proximal end port to form a watertight seal with said cap's annular projection.

* * * * *